United States Patent
Sakaue et al.

(10) Patent No.: US 6,804,387 B1
(45) Date of Patent: Oct. 12, 2004

(54) PATTERN MATCHING APPARATUS

(75) Inventors: Yoshikazu Sakaue, Tokyo (JP); Toshiya Ijichi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 638 days.

(21) Appl. No.: 09/628,275

(22) Filed: Jul. 28, 2000

(30) Foreign Application Priority Data

Aug. 27, 1999 (JP) .......................................... 11-240847

(51) Int. Cl.$^7$ ................................................ G06K 9/00
(52) U.S. Cl. ..................................... 382/141; 382/209
(58) Field of Search ............................... 382/141, 149, 382/173, 181, 209, 217, 218, 220, 310, 151, 168, 274, 275, 278; 348/129, 94, 95, 135

(56) References Cited

U.S. PATENT DOCUMENTS

| | | | | |
|---|---|---|---|---|
| 4,441,205 A | * | 4/1984 | Berkin et al. | 382/151 |
| 4,783,829 A | * | 11/1988 | Miyakawa et al. | 382/199 |
| 4,942,619 A | * | 7/1990 | Takagi et al. | 382/218 |
| 5,694,482 A | * | 12/1997 | Maali et al. | 382/145 |
| 6,151,406 A | * | 11/2000 | Chang et al. | 382/147 |
| 6,219,452 B1 | * | 4/2001 | Nair et al. | 382/217 |
| 6,229,921 B1 | * | 5/2001 | Wenzel et al. | 382/209 |

* cited by examiner

Primary Examiner—Bhavesh M. Mehta
Assistant Examiner—Sheela Chawan
(74) Attorney, Agent, or Firm—McDermott Will & Emery LLP (57) ABSTRACT

A pattern matching method comprising the steps of: computing matching scores while shifting a template picture in increments of four pixels so as to find a pixel corresponding to a maximum matching score; performing, starting from the pixel of the maximum matching score obtained in the matching score computing step, matching computations on each of an upper, a lower, a left-hand and a right-hand pixel surrounding the starting pixel in order to reach a pixel having a higher matching score than any other surrounding pixel; coming to a stop when the pixel with the highest matching score is reached; and adding to the highest matching score obtained in the computation performing step a correction value which takes into account the matching scores of the pixels adjacent to the highest matching score pixel, whereby matching score allowances due to dislocated pixels are corrected.

7 Claims, 8 Drawing Sheets

TWO STEPS SERCH INCLUDING EVERY 4 PIXELS SERCH AND 7×7 PIXELS BASIC SERCH

FIG. 3A

13×13 PIXELS BASIC SERCH

FINAL ENSURING

FIG. 9 a:TEMPLATE b:COINCIDING CASE c:DIVERSING CASE d:PART OF CHARACTER F

FIG. 10A            FIG. 10B

PATTERN MATCHING APPARATUS

BACKGROUND OF THE INVENTION

1. Field of the Invention

The present invention relates to a shading pattern matching apparatus for inspecting marks printed illustratively on the surface of semiconductor device packages and, more particularly, to an apparatus for modifying a maximum score value of pattern matching and for reaching a maximum score value at high speed.

2. Description of the Background Art

Shading pattern matching through the use of TV camera pictures is a well-known method for illustratively inspecting printed marks on semiconductor packages or like objects. This pattern matching method is used in diverse applications. A typical use of the method is outlined below.

Figure 1:
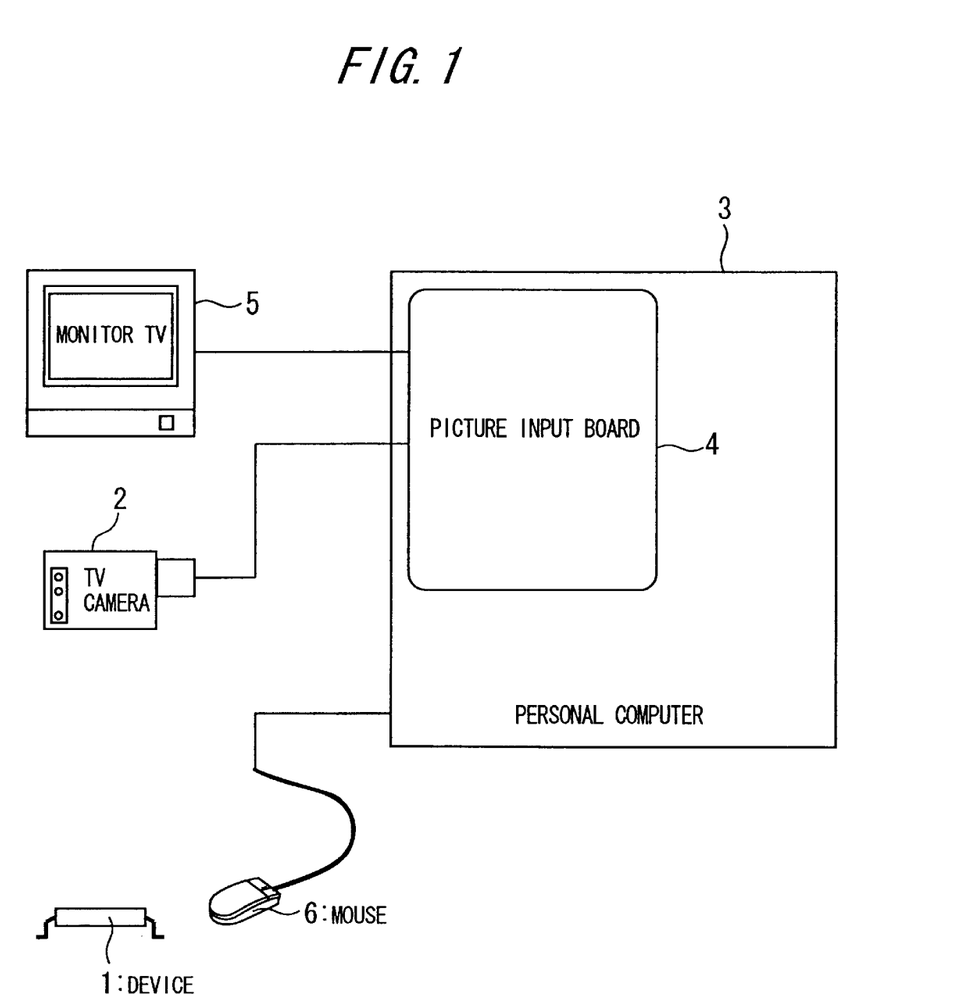
FIG. 1 is a schematic view of devices configured to implement a shading pattern matching method according to the invention.

FIG. 1 is a schematic view of devices configured to implement this type of shading pattern matching.

(1) In FIG. 1, a TV camera 2 takes pictures of a printed face of an object, illustratively a top of a semiconductor device 1. In the setup of FIG. 1, the field of view of the TV camera 2 is adjusted so that a minimum printed line width is composed of at least three pixels.

(2) A video signal from the TV camera 2 is converted to digital format before being written to a memory of a personal computer 3. Digital data are written to the memory in such a manner that they may be easily retrieved by the personal computer 3. Typically, a TV screen is defined by Y and X coordinates representing the longitudinal and lateral directions respectively, and the brightness of each pixel is read out in terms of a two-dimensional array expressed illustratively as br[y][x] (br=bright). When read out, memory contents may be converted back to the analog signal for display onto a TV monitor 5. The personal computer 3 is furnished with a mouse 6 or like means for interfacing with an operator.

(3) A picture of the first of a series of devices 1 with the same characters printed thereon is initially taken. The operator drags the mouse 6 to circumscribe an area that comprises the printed characters. Image processing software on the personal computer 3 identifies the individual characters in the area circumscribed by dragging the mouse. Steps (3.1) through (3.3) below are carried out to identify the characters.

(3.1) A maximum, a minimum, and an intermediate level of brightness in the circumscribed area are obtained.

(3.2) Within the circumscribed area, a maximum level of brightness is obtained on each of rows which extend lateral and which are followed from top to bottom. Any row whose maximum brightness level exceeds the intermediate level acquired in step (3.1) is judged to have character parts. Accomplishing this step reveals the beginning and end (e.g., limits of a range) of a character string as viewed longitudinally.

(3.3) Within the character string thus detected, a maximum level of brightness is obtained on each of columns which extend longitudinally and which are followed from left to right. Any column whose maximum brightness level exceeds the intermediate level is judged to have a character. Accomplishing these steps defines the vertical and horizontal limits of each character.

(4) The brightness level within the range of each character on a two-dimensional plane is recorded in the form of a template. The recording is made for all characters constituting the character string.

(5) A picture of the next device is taken.

(6) In considering repeatability of the device position and printed character position on the devices, maximum allowances are set for a predictable allowance in character position between the first package and the next package.

Figure 8:
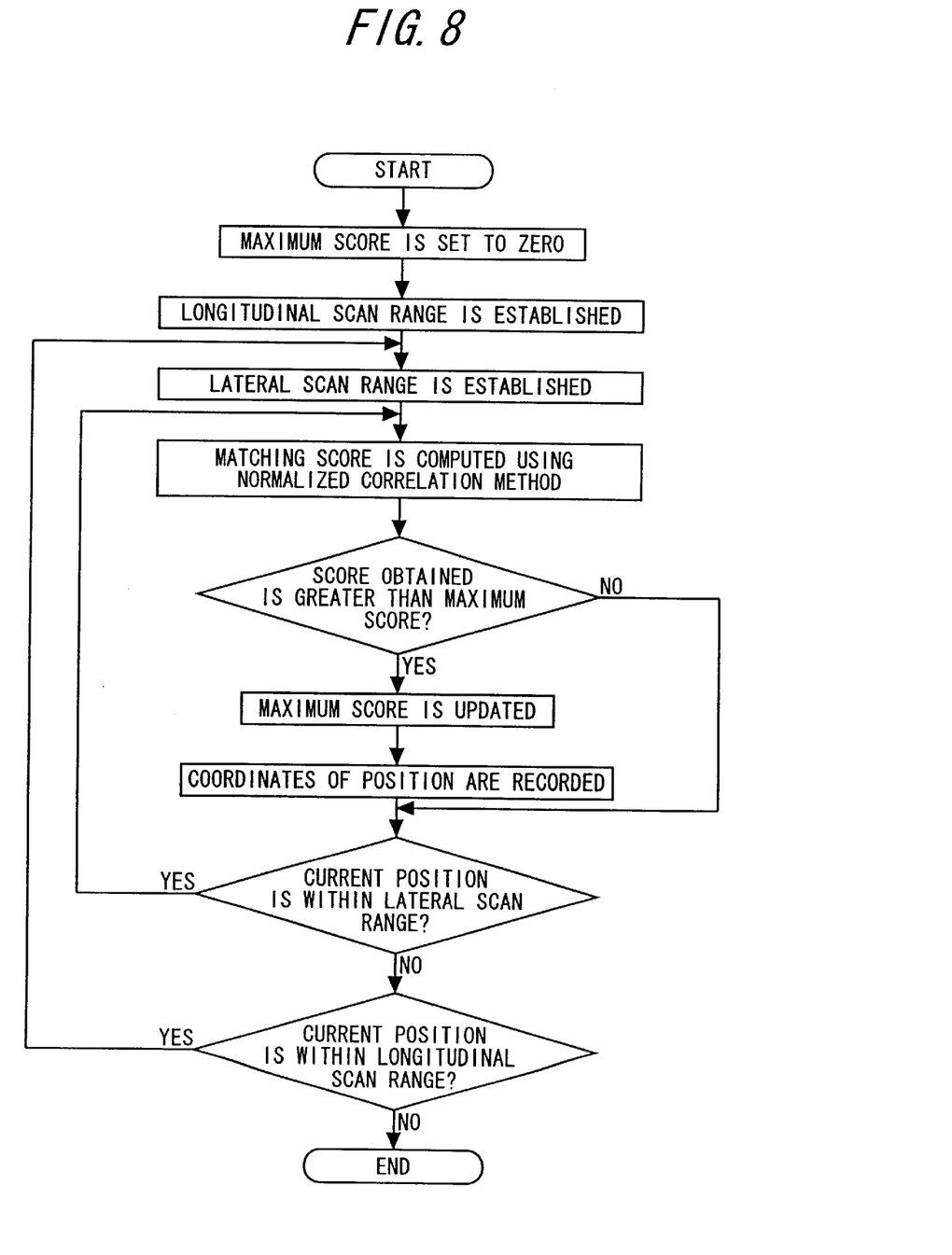
FIG. 8 is a flowchart of steps constituting a conventional pattern matching method.

(7) The template is applied to each of the input pictures within the maximum predictable allowance range, whereby the most likely position of coincidence between the picture and the template is obtained. Specific steps constituting the processing of this pattern matching method are discussed below. FIG. 8 is a flowchart of the steps in question.

(7.1) The maximum score value is initialized to zero. Then, a maximum allowance range is set around the position in which a first character has appeared in the picture of the first device. The longitudinal and lateral limits are determined.

(7.2) In the first position, a matching score is computed using the expression (1) below. The procedure is generally known as the shading pattern matching method based on normalized correlation:

$$r^2 = \{n\Sigma fg - \Sigma f \Sigma g\}^2 / \{n\Sigma f^2 - (\Sigma f)^2\}\{n\Sigma g^2 - (\Sigma g)^2\} \qquad (1)$$

where, $r^2$ stands for a score (degree of coincidence), "f" for the brightness of each pixel in an input picture, "g" for the brightness of each pixel in the template, and "n" for the number of effective pixels in the template.

(7.3) If the score obtained by the computations above is judged greater than the initially established maximum score value, then the maximum score value is updated to reflect the acquired score. The longitudinal and lateral coordinates of the position in effect at that point are recorded.

(7.4) Within the range of lateral scan, the current position is advanced right one pixel, and the computations of (7.2) and (7.3) above are repeated.

(7.5) If the range of lateral scan is found exceeded, a check is made to see if the current position is still within the range of longitudinal scan. If the current position is judged to be within the longitudinal scan range, the position is moved down one pixel, and lateral scan is repeated from the leftmost position toward the rightmost position.

(7.6) When the longitudinal scan range is judged to be exceeded, the processing is brought to an end.

(8) The maximum score value eventually obtained above represents the degree of coincidence of the first character between the first device and the second device. The higher the degree of coincidence, the greater the score value.

(9) The second character on the first device is then used as a template for matching the next character. This step is the same as the process (7) above.

(10) Likewise, the third and subsequent characters are used as templates for matching the respective characters. If the lowest value of the maximum score for a given character is judged lower than a predetermined threshold value, then the second device is judged to be faulty.

(11) The same inspection is carried out on a third device. The processing above is continued until the devices having the same characters have been exhausted.

There are major problems, outlined in (A) and (B) below, in conducting the above-described shading pattern matching method.

Figure 9:
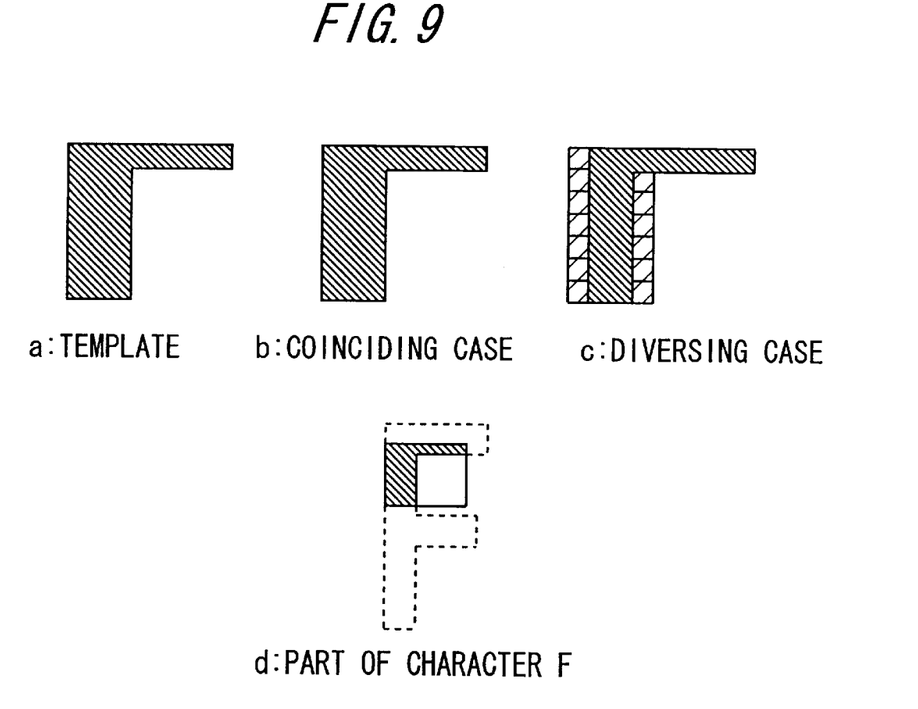
FIGS. 9A through 9D are explanatory views showing illustratively how slight allowances of an object (an alphabetic character "F" in this example) picked up by a TV camera produce finely different signals.

(A) FIGS. 9a through 9c show a template, an example of a template picture coinciding with a picked-up picture, and an example of the template picture diverging from a picked-up picture. FIG. 9d depicts part of an alphabetic character "F" coinciding with the template. The character line is three pixels wide as described earlier. More specifically, FIG. 9a illustrates part of a template, and FIG. 9b indicates part of a character in which the corresponding template coincides exactly with a picked-up picture. In the picture of FIG. 9c taken by TV camera, the template is shown diverging lateral by half-pixel from the picture being inspected. The densely shaded portion in rectangular portions in FIG. 9c represents a pixels 100 percent bright, while the portions thinly shaded by diagonal lines denote pixels 50 percent bright.

Figure 10A:
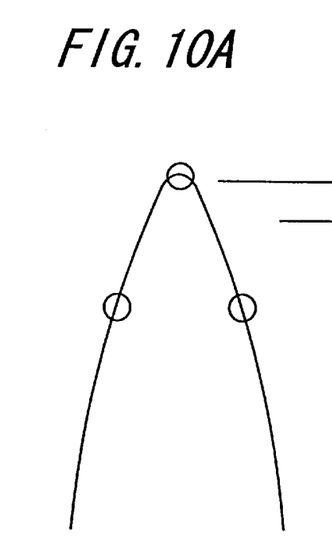
FIGS. 10A and 10B are schematic views of different matching scores resulting from slightly divergent input pictures.
Figure 10B:
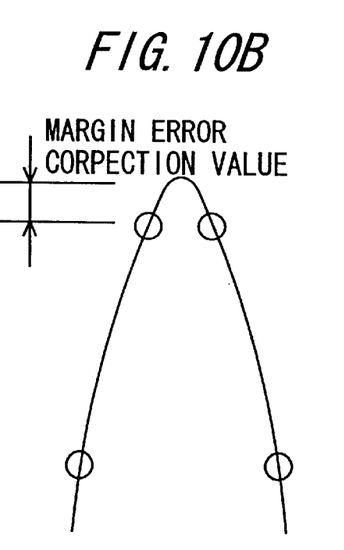

FIGS. 10A and 10B are graphic representations showing how the score typically changes when a template is shifted lateral one pixel at a time. As illustrated, FIG. 10A includes a high score at a point where the template coincides with the picture 100 percent whereas FIG. 10B indicates points of mismatch with low scores. The phenomenon is an error resulting from varying conditions under which pictures are taken by the TV camera.

Even simple checks of relatively distinct uppercase alphabetic characters and numeric characters are not immune to the above kind of inaccuracy. Distinction of characters with limited differences therebetween, such as "Q" and "O," is all the more difficult to carry out.

(B) It is necessary to repeat pattern matching computations about each pixel on the two-dimensional plane within the range where characters are likely to appear during the character inspection on the second and subsequent devices, as discussed in step (6) above. The process takes an inordinately long period of time to accomplish.

SUMMARY OF THE INVENTION

It is therefore an object of the present invention to overcome the above and other deficiencies of the prior art and to provide a pattern matching apparatus capable of correcting drops in matching scores caused by pixel allowances during pattern matching so as to continuously attain maximum matching scores, whereby closely resembled characters that were difficult to distinguish from one another before are identified individually with high accuracy.

It is another object of the present invention to provide a pattern matching apparatus for establishing as a starting point the position of a greatest matching score resulting from a pixel-skipping scan (skipped illustratively in increments of 4 pixels), then subjecting four pixels around the starting point in upper, lower, left-hand and right-hand directions to matching through hill-climbing method so as to search higher matching scores until the maximum score is reached in the shortest possible time.

The above objects of the present invention are achieved by a pattern matching apparatus performing a pattern matching while comparing a template picture with a picture under inspection. The apparatus includes a maximum score detection unit for shifting the template picture with respect to the picture under inspection in order to compute matching scores between the two pictures and thereby to detect a maximum score among the matching scores as well as a maximum position in which the maximum score is generated. The apparatus also includes a unit for computing a correction value based on matching scores generated at positions adjacent to the maximum position. The apparatus further includes a unit for correcting the matching score by adding the maximum score with the correction value.

The above objects of the present invention are achieved by a pattern matching apparatus performing a pattern matching while comparing a template picture with a picture under inspection. The apparatus includes a unit for shifting the template so that the template skips a predetermined numbers of pixels, computing matching scores at individual shifted positions, and setting a position in which the greatest one among the matching scores is generated to a starting position. The apparatus also includes a unit for shifting the template among positions corresponding to four pixels surrounding a starting position successively in order to compute matching scores at each of the positions. If any one of matching scores corresponding to the four pixels is greater than the matching score of the starting position, the position in which the greatest score is generated is set to a new starting position. If the matching score of the starting position is greater than any of the matching scores corresponding to the four pixels, the matching score of the starting position is set to the maximum value and the starting position is set to the maximum position.

The above objects of the present invention are achieved by a pattern matching apparatus performing a pattern matching while comparing a template picture with a picture under inspection. The apparatus includes a unit for shifting the template so that the template skips a predetermined numbers of pixels, computing matching scores at individual shifted positions. If a matching score equal to a predetermined value or more is detected, a position in which the matching score in question is generated is set to a starting position. The apparatus also include a unit for shifting the template among positions corresponding to four pixels surrounding a starting position successively in order to compute matching scores at each of the positions. If any one of matching scores corresponding to the four pixels is greater than the matching score of the starting position, the position in which the greatest score is generated is set to a new starting position. If the matching score of the starting position is greater than any of the matching scores corresponding to the four pixels, the matching score of the starting position is set to the maximum value, and the starting position is set to the maximum position.

Other objects and further features of the present invention will be apparent from the following detailed description when read in conjunction with the accompanying drawings.

BEST MODE OF CARRYING OUT THE INVENTION

First Embodiment

The first embodiment of the invention is designed to resolve the difficulty discussed in paragraph (A) above in connection with the background art. Specifically, the embodiment is intended to correct drops in matching scores caused by pixel allowances between picked-up pictures and a template by adding a correction value which takes into account the scores of adjacent positions (upper, lower, left-hand, right-hand pixels).

FIGS. 9A through 9D are referred to for the description that follows. A picture that should coincide with a template (FIG. 9B) may diverge by one pixel when picked up by the TV camera, as shown in FIG. 9C. In the case of FIG. 9C, the densely shaded portion is 100 percent bright and the thinly shaded portion is 50 percent bright. FIG. 10A shows scores acquired from the state of FIG. 9b, and the states in which the template is shifted left and right one pixel from the position shown in FIG. 9b. FIG. 10B depicts matching scores acquired from the state of FIG. 9C, states in which the template is shifted left and right one pixel from the position shown in FIG. 9c, and the state in which the template is shifted left or right two pixels from the position shown in FIG. 9c. As opposed to the results in FIG. 10A, the scores in FIG. 10B are considerably lower than those in FIG. 10A. In order to compensate for the reduced score values, the first embodiment adds a correction value (margin of error) to the maximum value in FIG. 10B. The correction value is computed using the expression (2) below:

Corrected score=uncorrected score+const1×(vertical lower pixel value−vertical upper pixel value)$^2$+const2×(vertical right-hand pixel value−vertical left-hand pixel value)$^2$ (2)

The pattern matching method practiced as the first embodiment is described below in more specific terms. The devices configured to implement the pattern matching method are as illustrated in FIG. 1.

Figure 2:
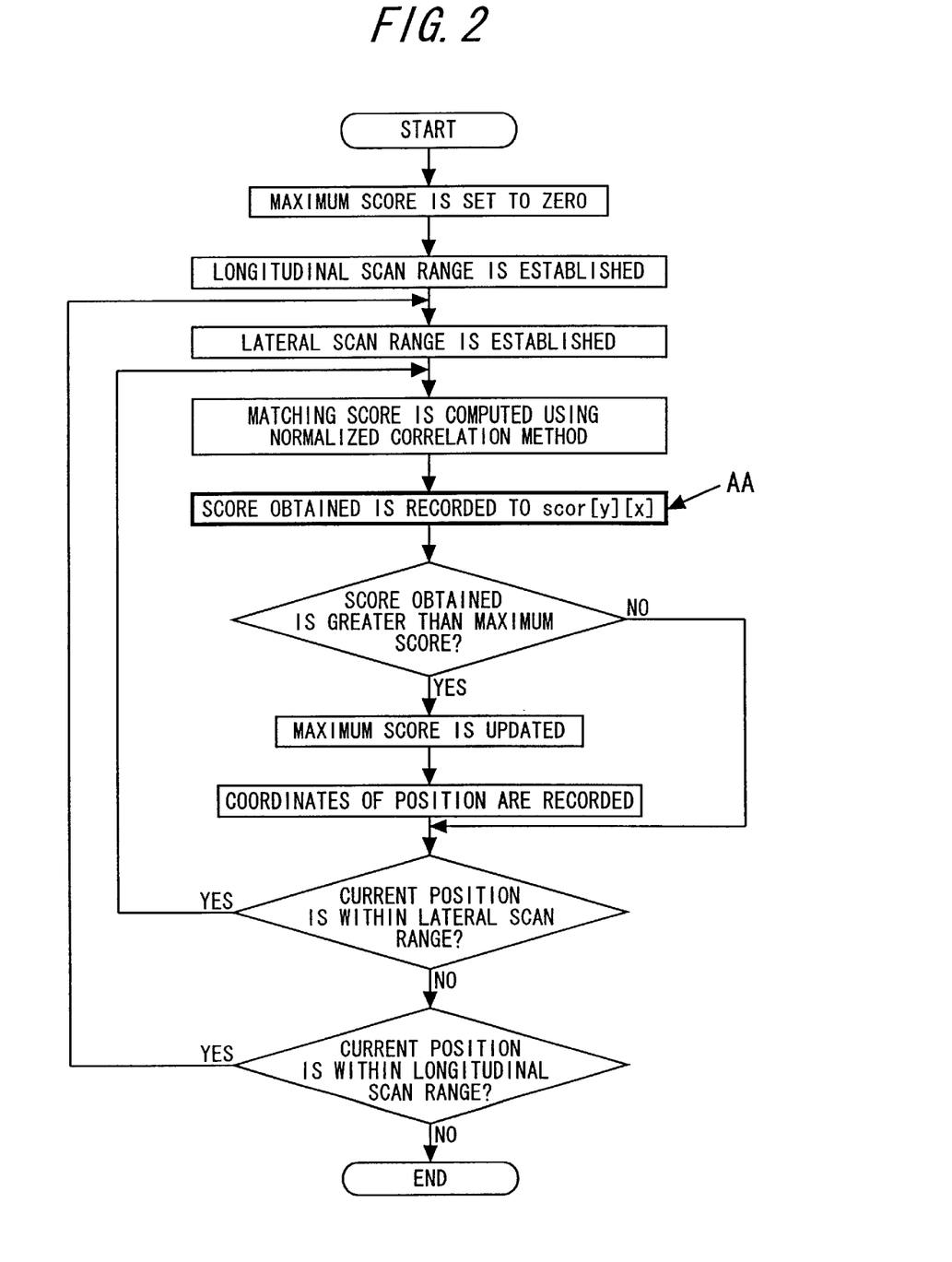
FIG. 2 is a flowchart of steps constituting a first embodiment of the invention for correcting a matching score.

(1) FIG. 2 is a flowchart of steps for performing computations to correct matching scores according to the first embodiment. Supplementing the flowchart of FIG. 8 with a process AA provides the flowchart of FIG. 2. In FIG. 2, the template is applied pixel by pixel to an input picture within maximum ranges of predictable allowances so that the position of maximum coincidence between the template and the picture is obtained. The steps to be taken are as follows:

(1.1) A maximum score value is initially set to zero. Maximum allowance ranges are then set around a first position where a first character of a first device has appeared. Specifically, a maximum range of longitudinal scan and a maximum range of lateral scan are established.

(1.2) In the first position, a matching score is computed in accordance with the expression (1) below. The process is generally known as shading pattern matching based on normalized correlation.

$$r^2 = \{n\Sigma fg - \Sigma f\Sigma g\}^2 / \{n\Sigma f^2 - (\Sigma f)^2\}\{n\Sigma g^2 - (\Sigma g)^2\} \quad (1)$$

where, r$^2$ stands for a score (degree of coincidence), "f" for the brightness of each pixel in an input picture, "g" for the brightness of each pixel in the template, and "n" for the number of effective pixels in the template.

(1.3) In the added process AA, the score obtained above is recorded to score[y][x].

(1.4) If the score obtained by the computations above is judged greater than the initially established maximum score value, then the maximum score value is updated to reflect the acquired score. The longitudinal and lateral coordinates of the position in effect at that point are recorded.

(1.5) Within the range of lateral scan, the current position is advanced right one pixel, and the computations of (1.2) and (1.4) above are repeated.

(1.6) If the range of lateral scan is found exceeded, a check is made to see if the current position is still within the range of longitudinal scan. If the current position is judged to be within the longitudinal scan range, the position is moved down one pixel, and lateral scan is repeated from the leftmost position toward the rightmost position.

(1.7) When the longitudinal scan range is judged to be exceeded, the processing is brought to an end.

The scores obtained above for each of the pixels within the scan ranges are recorded to a scor[y][x] array.

(2) A corrected score is then acquired by use of the expression (2) above. The expression (3) below represents a C-coded array, with "ymax" and "xmax" denoting the coordinates in effect when a maximum score value "scormax" is obtained:

Corrected score=scormax+const1×(scor[ymax+1][xmax]−scor[ymax−1][xmax])$^2$+const2×(scor[ymax][xmax+1]−scor[ymax][xmax−1])$^2$ (3)

(3) In the foregoing expression, constants "const1" and "const2" are selected to be about 0.002 each by arranging the expression in such a manner that the score of maximum coincidence is 1,000. The constants are obtained by observing the matching score array "scor[y][x]" from pictures taken of the same device moved in fine increments under the TV camera. When measurements close to those in FIGS. 10A and 10B are acquired, the margin of error and the correction value are determined in consideration of value differences between the upper, lower, left-hand and right-hand pixels around the pixel in the middle having the maximum score value. These values may remain unchanged if such conditions as the magnifying power of the camera and character size are the same.

(4) Every time the pattern matching of one character comes to an end, the correction computations above are carried out on the maximum score value obtained.

As a variation of the first embodiment, the expression (4) below derived from the expression (3) above may be used. The results are substantially the same between the two expressions but the time required with the expression (4) is appreciably shorter than with the expression (3) above.

Corrected score=scormax+const3×abs(scor[ymax+1][xmax]−scor[ymax−1][xmax])+const4×abs(scor[ymax][xmax+1]−scor[ymax][xmax−1]) (4)

where, "abs" stands for an absolute value.

In the expression (4) above, constants "const3" and "const4" may be set illustratively for about 0.1 each.

As described, the first embodiment provides the following major benefits:

1) The embodiment suppresses allowances of scores resulting from slight shifting of the image pickup position. With score variations thus minimized, it is possible finely to adjust a threshold value for matching, whereby characters are recognized with higher accuracy than before.

2) Correction computations are simpler and take less time to carry out than before.

Second Embodiment

In pattern matching using a template, the scope in which to perform template matching computations on an input picture signal of a second device is determined by considering two ranges: a range of allowance resulting from the positioning of the device, and a range of allowance stemming from the printing of characters onto the device.

Figure 3A:
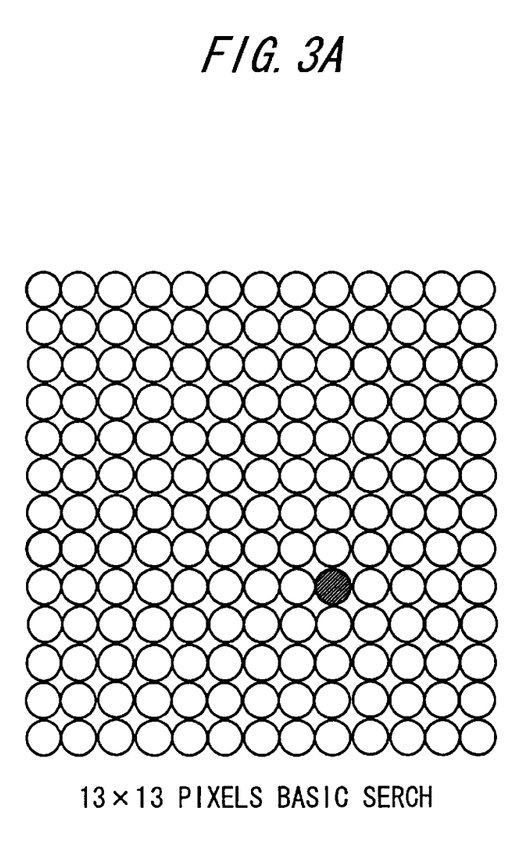
FIG. 3A is a schematic view showing a method for performing matching computations on each of the pixels making up a 13×13 pixel two-dimensional plane.
Figure 3B:
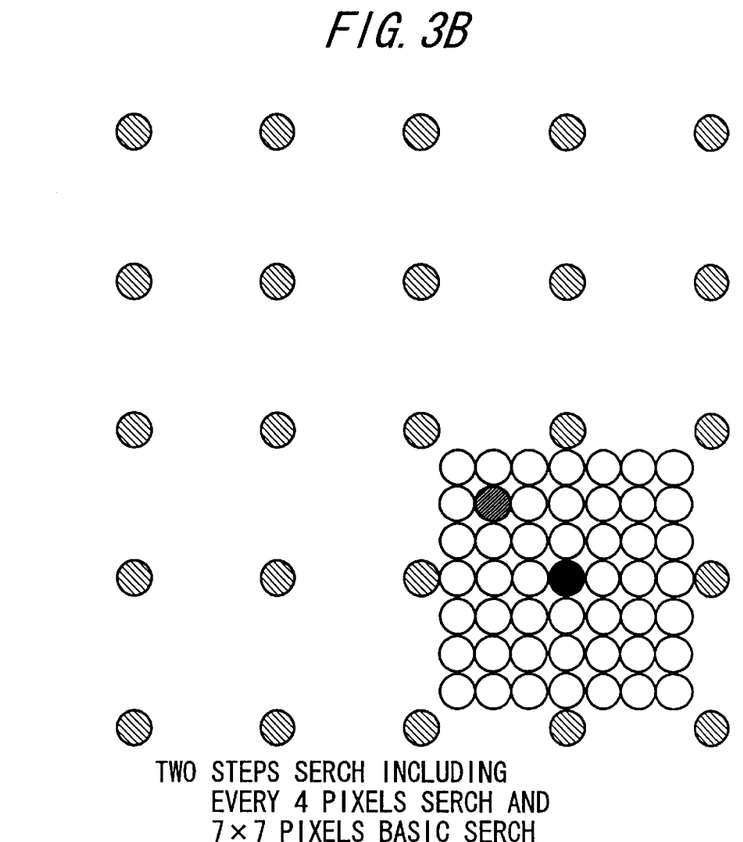
FIG. 3B is a schematic view depicting how to search for an optimum score pixel in rough increments of four pixels and how to perform minute matching computations over a 9×9 pixel range around the greatest score pixel.

In the prior art examples above, matching computations were carried out on each of all pixels within the applicable ranges. FIG. 3A shows how the 13×13 pixel two-dimensional plane is subject to matching computations one pixel at a time. This method takes much time to accomplish because, with seven possibly divergent pixels considered to exist on one side of each target pixel, matching computations need to be conducted as many as 169 times (i.e., 13×13) on all pixels involved. By a slightly more streamlined method shown in FIG. 3B, the pixels are skipped in increments of three to have matching computations performed on every four pixels for a total of 25 pixels (5×5; indicated by circles shaded by thick diagonal lines in FIG. 3B). Of the 25 pixel positions, the one with the greatest matching score is regarded as the middle position (indicated by black-painted circle). On either side of the middle position, four pixels including the middle one are each subjected to matching computations for a total of 49 pixels (i.e., 7×7 pixels). With the streamlined method, matching computations are performed 74 times in all, approximately halving the conventional pixel-by-pixel computation count.

The second embodiment is aimed at further reducing the number of times matching computations are to be carried out. The steps involved are described below with reference to FIG. 4.

Figure 4:
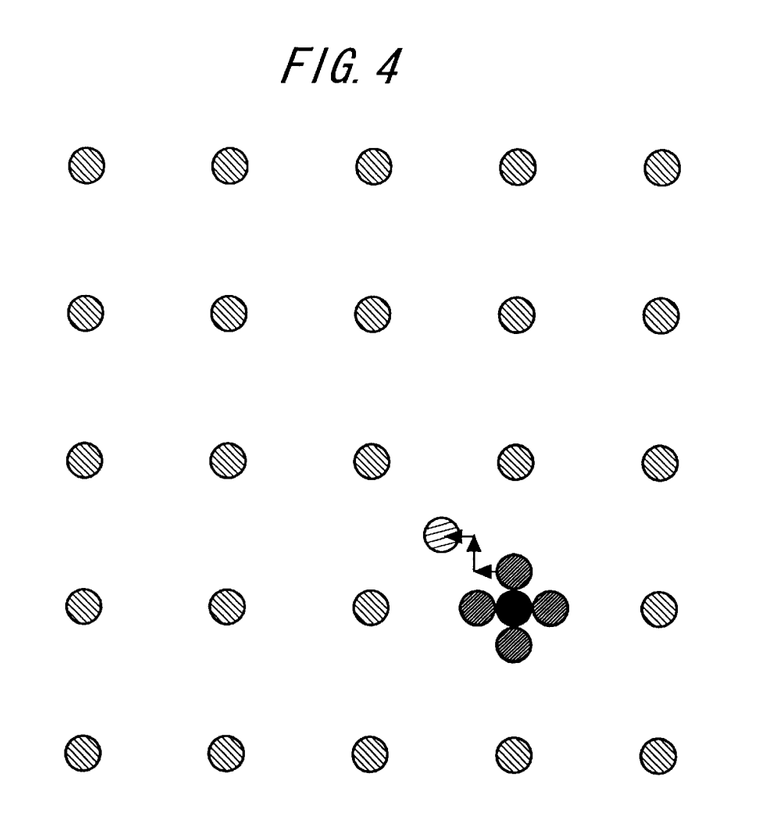
FIG. 4 is a schematic view of a second embodiment of the invention whereby a maximum score circle shaded by thin diagonal lines is ultimately reached starting from a black-painted circle reached earlier in increments of four pixels.

FIG. 4 shows how the second embodiment is implemented whereby the position of the maximum score (the circle shaded by thin diagonal lines) is ultimately reached starting from the position (black-painted circle) reached earlier in increments of four pixels.

1) Matching computations are performed on every four pixels (shaded by thick diagonal lines in FIG. 4). Of these pixels subjected to the matching computations, the one with the highest score value is determined as the next starting point (black-painted circle in FIG. 4).

2) Around the starting point (black circle in FIG. 4), four pixels (upper, lower, left-hand, right-hand) are subjected to a first matching process whereby their scores are obtained. It is assumed that this process yields the first-time result shown in FIG. 5.

3) The highest score among the four pixels around the starting point is 300 for the upper pixel. The upper pixel is then reached from the current starting point (with score of 100) in the middle. The 300-score position is regarded as the next starting point around which four pixels are likewise subjected to a second matching process. The pixel of the highest score is reached from the middle position every time the matching process is repeated (see the second through the fourth results in FIG. 5).

Figure 5:
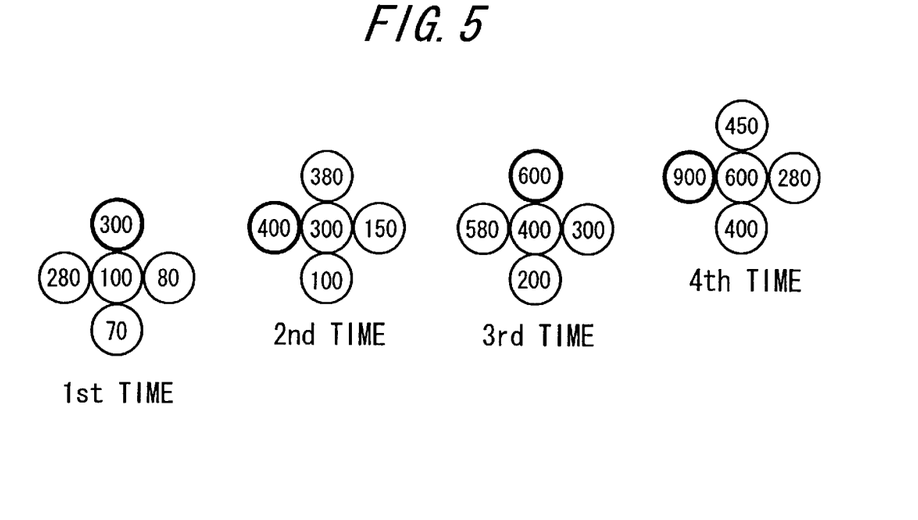
FIG. 5 is a schematic view of processes through which to reach the position of the greatest score by use of the second embodiment.
Figure 6:
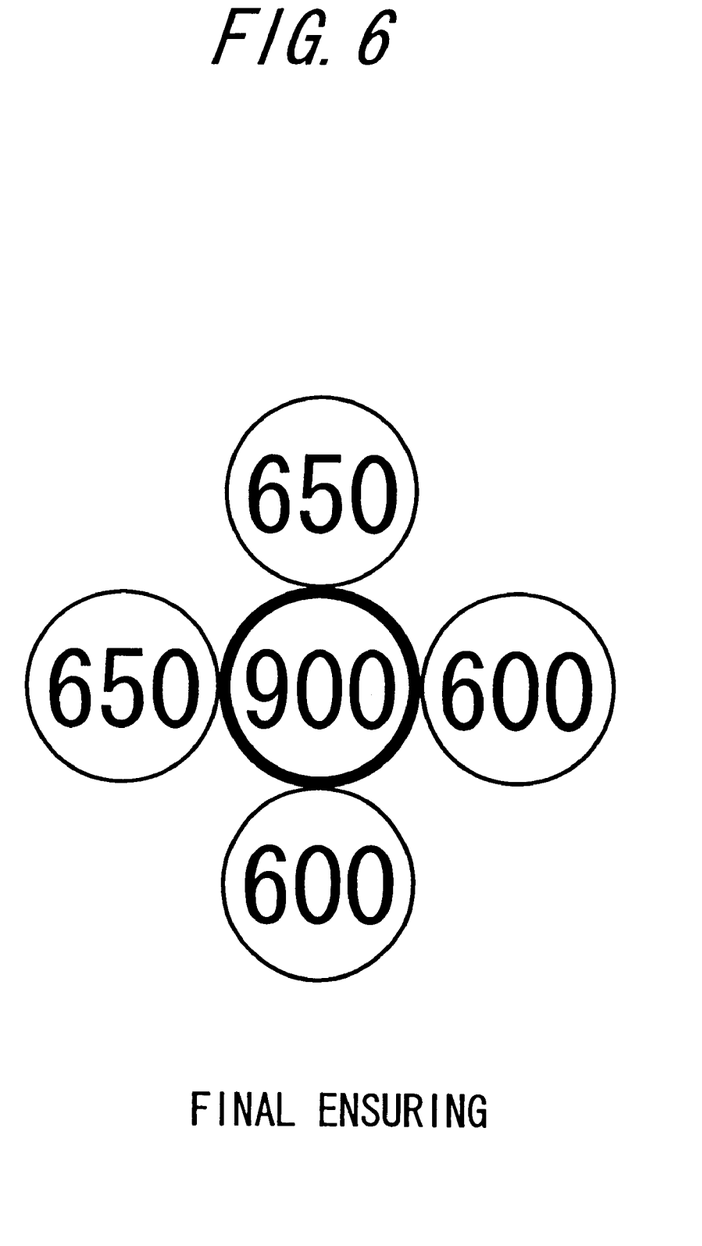
FIG. 6 is a schematic view of a state in which the maximum score position in the middle is reached by use of the second embodiment, the middle position having a score higher than any other positions around it.

4) Around the pixel with a score of 900 obtained in the fourth matching process as shown in FIG. 5, another four pixels are subjected to another matching process (FIG. 6), which happens to be the last. This is because the scores of the four pixels are lower than the score of 900 in the middle position, with no further search needed for a higher score. FIG. 4 indicates by arrows the track of the search made from the initial starting point (black-painted circle) to the highest score point (circle shaded by thin diagonal lines).

Described above are the specific steps constituting the second embodiment. The major benefit of this method is an appreciably reduced number of times matching computations need to be performed until the maximum score pixel is reached. In the example above, the computations are carried out four times to reach the maximum score pixel. With the computations for finally ensuring the maximum score pixel, 20 times (i.e., 5×4 times) computations reveal the maximum score pixel. As shown in FIG. 4, the greatest score pixel (circle shaded by thin diagonal lines) is positioned at the center of four circles shaded by thick diagonal lines, i.e., center of four pixels reached by the every four pixels search. In other words, the matching computations need be performed not four times but only twice on average to reach the maximum score point. Thus, with the computations for finally ensuring the maximum score pixel, a total of 12 times (i.e., 3×4 times) computations leads to the maximum score point. Even if the every four pixels search firstly performed is taken into account, the matching computations need only be carried out 37 times in total. This amounts to a significant reduction in matching count when compared with the cases of performing matching computations 169 times and 74 times discussed earlier in connection with the second embodiment. As such, the inventive method is appreciably more effectively than the conventional method.

Described above was the two-stage method: in the first stage, computations are performed 25 times in the every four pixels search; in the second stage, the maximum score pixel is searched for pixel by pixel and ultimately reached starting from the pixel of greatest score among ones obtained by the first stage. The number of pixels to be skipped in the first stage may be suitably determined depending on the size of characters to be recognized on target objects and other factors.

In the foregoing description, it was after the computations were performed 25 times in the first stage that the second-stage search was started from the highest score pixel. Alternatively, the second-stage search may be started as soon as a pixel with a score of, say, 100 or higher is detected. The latter method may be selected depending on the conditions of target objects.

Third Embodiment

If the first embodiment is carried out following execution of the second embodiment, then pattern matching is conducted in a much easier fashion than before.

Figure 7:
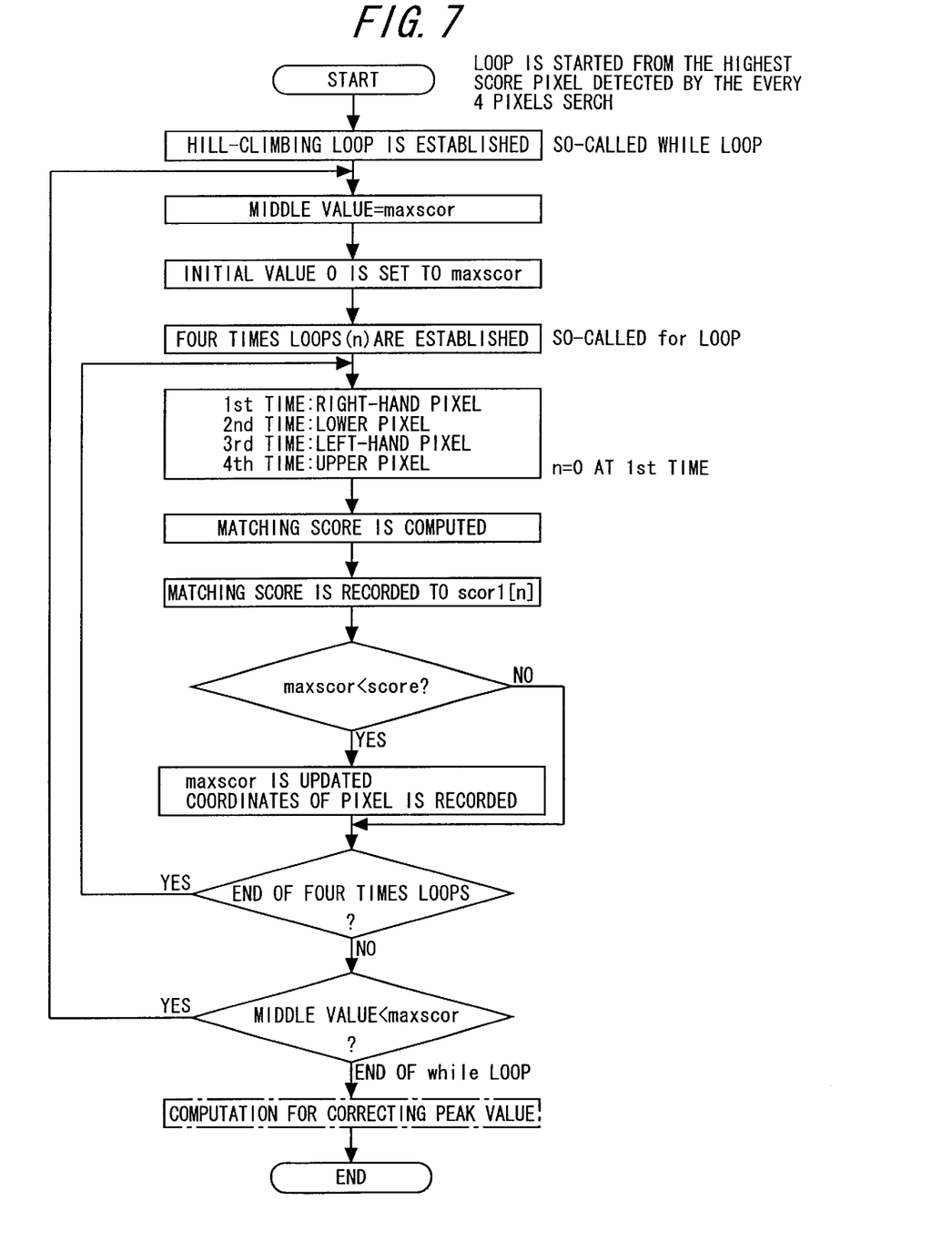
FIG. 7 is a flowchart of steps constituting a pattern matching method practiced as a third embodiment of the invention.

FIG. 7 is a flowchart of such steps constituting a pattern matching method practiced as the third embodiment of the invention. Described below with reference to FIG. 7 are key steps that characterize the third embodiment in techniques and in effects.

1) A search for the position of the greatest matching score is initially made by the every four pixels search. From that position, a search for the maximum score pixel is started. A hill-climbing loop (so-called while loop), to be described herein, is established.

2) In performing matching computations on the four pixels around the starting position in the middle, the right-hand pixel is subject to a first matching loop, the lower pixel to a second matching loop, the left-hand pixel to a third matching loop, and the upper pixel to a fourth matching loop. Every time the matching loop is carried out, a matching score is computed through shading pattern matching based on normalized correlation. The matching results are recorded to score result arrays of scor1[0] through scor1[3].

3) From the score result arrays of scor1[0] through scor1[3], the highest score pixel position is recorded, and the score of that position is updated as "maxscore."

4) When the four loops above have been completed, the score of the starting position in the middle is compared with the score "maxscore." If"maxscore" is judged to be higher than the starting position score, then the pixel position having "maxscore" is regarded as the new starting position in the middle. Matching scores are then obtained of the four pixels around the position in the middle having "maxscore."

5) If the score of the starting position in the middle turns out to be higher than any other scores of the four surrounding pixels, the hill-climbing loop execution is terminated.

6) Computations are now started to correct the peak value as discussed in connection with the first embodiment. Utilizing the scores recorded in the scor1[n] array, the expression for correcting peak scores with the first embodiment is replaced by the expression (5) below with the third embodiment.

$$\text{Corrected score} = \text{scormax} + \text{const1} \times (\text{scor1}[0] - \text{scor1}[2])^2 + \text{const2} \times (\text{scor1}[1] - \text{scor1}[3])^2 \quad (5)$$

As described, the third embodiment offers the following major advantages:

1) Because scor1[n] are updated every time the matching scores of the surrounding four pixels are computed, the most recently updated score may be used unmodified for computing the corrected score. This eliminates the need for complicated computations such as the search for scores in absolute coordinates as described in conjunction with the first embodiment.

2) The scor[y][x] array discussed in connection with the first embodiment requires using as many as 3,000 memory units to accommodate 640 pixels by 480 pixels for a single screen. By contrast, the third embodiment provides comparable results by using only four memory units.

According to the first aspect of the present invention, allowances in matching scores due to slight dislocations of the image pickup position are prevented. With score variations thus minimized, it is possible finely to adjust a threshold value for matching, whereby characters of small differences therebetween are recognized individually with higher accuracy than before. In addition, correction computations are made simpler and take less time to carry out than ever before.

Also according to the second aspect of the present invention, the most recently updated value may be used unmodified for computing corrected score. This eliminates the need for complicated computations such as the search for scores in absolute coordinates. A limited memory resource is sufficient for allowing the computations to be carried out.

Further according to the third aspect of the present invention, it is possible to reduce the number of times of matching computations need to be performed before the maximum score is obtained. That is, the maximum score is reached in the shortest possible time.

Further, the present invention is not limited to these embodiments, but variations and modifications may be made without departing from the scope of the present invention.

The entire disclosure of Japanese Patent Application No. Hei 11-240847 filed on Aug. 27, 1999 including specification, claims, drawings and summary are incorporated herein by reference in its entirety.

What is claimed is:

1. A pattern matching apparatus performing a pattern matching while comparing a template picture with a picture under inspection, said apparatus comprising:

maximum score detection means for shifting the template picture with respect to the picture under inspection in order to compute matching scores between the two pictures and thereby to detect a maximum score among the matching scores as well as a maximum position in which the maximum score is generated;

means for computing a correction value based on matching scores generated at positions adjacent to said maximum position; and means for correcting said matching score by adding said maximum score with said correction value.

2. The pattern matching apparatus according to claim 1 wherein said maximum score detection means further comprising:

means for shifting the template so that said template skips a predetermined numbers of pixels, computing matching scores at individual shifted positions, and setting a position in which the greatest one among said matching scores is generated to a starting position;

means for shifting the template among positions corresponding to four pixels surrounding a starting position successively in order to compute matching scores at each of said positions;

means for setting, if any one of matching scores corresponding to said four pixels is greater than the matching score of said starting position, the position in which the greatest score is generated to a new starting position; and means for setting, if the matching score of said starting position is greater than any of the matching scores corresponding to said four pixels, said matching score of said starting position to said maximum value as well as the starting position to said maximum position.

3. The pattern matching apparatus according to claim 1 wherein said maximum score detection means further comprising:

means for shifting the template so that said template skips a predetermined numbers of pixels, computing matching scores at individual shifted positions, and if a matching score equal to a predetermined value or more is detected setting a position in which the matching score in question is generated to a starting position;

means for shifting the template among positions corresponding to four pixels surrounding a starting position successively in order to compute matching scores at each of said positions;

means for setting, if any one of matching scores corresponding to said four pixels is greater than the matching score of said starting position, the position in which the greatest score is generated to a new starting position; and means for setting, if the matching score of said starting position is greater than any of the matching scores corresponding to said four pixels, said matching score of said starting position to said maximum value as well as the starting position to said maximum position.

4. The pattern matching apparatus according to claim 1 wherein said correction value is given by a following expression: correction value=const1×{(matching score corresponding to one of adjacent positions in vertical direction)−(matching score corresponding to the other of adjacent positions in vertical direction)}²+const2×{(matching score corresponding to one of adjacent positions in horizontal direction)−(matching score corresponding to the other of adjacent positions in horizontal direction)}² where, const1 and const2 represent a constant each.

5. The pattern matching apparatus according to claim 1 wherein said correction value is given by a following expression: correction value=const3×abs{(matching score corresponding to one of adjacent positions in vertical direction)−(matching score corresponding to the other of adjacent positions in vertical direction)}+const4×abs{(matching score corresponding to one of adjacent positions in horizontal direction)−(matching score corresponding to the other of adjacent positions in horizontal direction)} where, const3 and const4 represent a constant each, and abs denotes an absolute value.

6. A pattern matching apparatus performing a pattern matching while comparing a template picture with a picture under inspection, said apparatus comprising:

means for shifting the template so that said template skips a predetermined numbers of pixels, computing matching scores at individual shifted positions, and setting a position in which the greatest one among said matching scores is generated to a starting position;

means for shifting the template among positions corresponding to four pixels surrounding a starting position successively in order to compute matching scores at each of said positions;

means for setting, if any one of matching scores corresponding to said four pixels is greater than the matching score of said starting position, the position in which the greatest score is generated to a new starting position; and means for setting, if the matching score of said starting position is greater than any of the matching scores corresponding to said four pixels, said matching score of said starting position to said maximum value as well as the starting position to said maximum position.

7. A pattern matching apparatus performing a pattern matching while comparing a template picture with a picture under inspection, said apparatus comprising:

means for shifting the template so that said template skips a predetermined numbers of pixels, computing matching scores at individual shifted positions, and if a matching score equal to a predetermined value or more is detected setting a position in which the matching score in question is generated to a starting position;

means for shifting the template among positions corresponding to four pixels surrounding a starting position successively in order to compute matching scores at each of said positions;

means for setting, if any one of matching scores corresponding to said four pixels is greater than the matching score of said starting position, the position in which the greatest score is generated to a new starting position; and means for setting, if the matching score of said starting position is greater than any of the matching scores corresponding to said four pixels, said matching score of said starting position to said maximum value as well as the starting position to said maximum position.

* * * * *